July 14, 1936. C. J. RENNEKAMP 2,047,708

CLIP FASTENER FOR AUTOMOBILE RADIATOR COVERS

Filed Oct. 4, 1935

INVENTOR.
Clarence J. Rennekamp.
BY
Wood & Wood
ATTORNEYS.

Patented July 14, 1936

2,047,708

UNITED STATES PATENT OFFICE 2,047,708

CLIP FASTENER FOR AUTOMOBILE RADIATOR COVERS

Clarence J. Rennekamp, Silverton, Ohio, assignor to Auto Vehicle Parts Company, Newport, Ky., a corporation of Kentucky Application October 4, 1935, Serial No. 43,575

1 Claim. (Cl. 24—255)

This invention relates to an improved clip fastener, particularly adapted for clipping and conveniently detachably securing a fabric or pliable covering over the front of an automobile radiator or guard grille thereof.

An object of the invention is to provide a clip fastener for quickly and conveniently applying a fabric or pliable covering to the front side of an automobile radiator or radiator guard grille, of simple manufacture, durable, and applicable to all of the prevailing types of automobile radiator fronts.

Various other features and advantages of the invention will be more fully set forth in a description of the accompanying drawing, in which.

Figure 1:
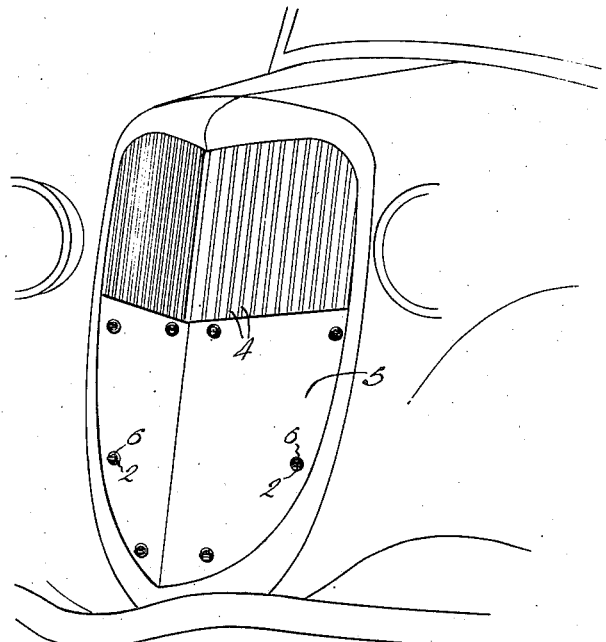
Figure 1 is a diagrammatic perspective view of the front of an automobile, illustrating a radiator cover applied and securely held in place over the lower front part of the radiator guard by a plurality of the improved clip fasteners.
Figure 2:
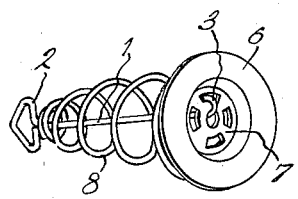
Figure 2 is a perspective view of the improved fastener.
Figure 3:
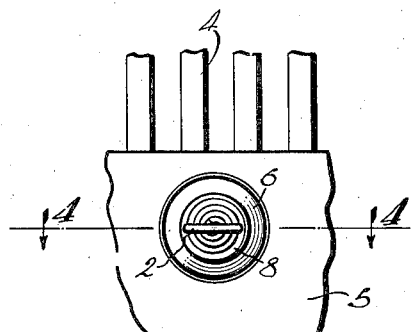
Figure 3 is an enlarged plan view of the fastener in position for securing a cover to the bars of a grille guard for an automobile radiator front.
Figure 4:
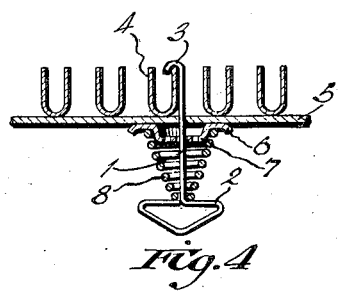
Figure 4 is a section on line 4—4, Figure 3.

It is customary to protect the front side of an automobile radiator in driving when the weather is at or below a freezing temperature by applying a covering over the grille guard of the radiator, or directly over the radiator, principally for the lower half thereof. Likewise, for summer driving, it is also customary to cover the guard or radiator with a wire screen fabric.

In the drawing a fabric or paperboard covering is illustrated and preferably is of a pattern outline to fit within the framing of the radiator or radiator guard, and is held in place by a plurality of determinately spaced clip fasteners, the fasteners enabling the covering to be easily and quickly applied or removed, and securely held in place when applied.

Referring to the drawing, 1 indicates a key, preferably formed of wire bent at one end into a loop 2 forming a head or fingerhold, and, at the opposite or forward end, is bent to form a hook 3 for engaging with a grille bar 4, or the like, of a radiator guard or bars or tubes of a radiator. The shank portion of the key engages through an aperture punched in the covering 5 and carries a washer 6 to compressibly bear upon the front face of the cover and against bars of the guard or radiator front.

The washer 6 has a central, circular embossment or hub 7 for socketing into the base end of a helical spring 8 interposed between the head of the key and the washer. The formation of a washer seats and confines the spring against lateral displacement. The plane or head portion of the embossment or hub is punched with a series of apertures for interlocking the hook end of the key with the washer for holding the parts in an assembled arrangement or unit ready for application.

To attach the covering, the hook end of the key is inserted through an aperture in the cover and the key pressed inwardly between a pair of bars of the grille guard to a depth which will enable the hook end of the key to be hooked to the rear side of a bar. The spring, under its compressed condition, yieldingly binds the key to a bar and clamps the portion of the cover engaged against the front side of the bar of the radiator front.

Any number of fasteners sufficient to properly hold the cover in place may be employed, principally distributed about the margin of the cover and at appropriate locations for hooking with a bar of the radiator guard or radiator itself.

Figure 5:
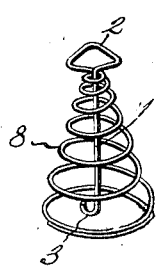
Figure 5 is a perspective view of a modified form of fastener.

It is feasible to eliminate the washer for a reduction in the cost of the device, allowing the base coil to bear against the cover. To lock the spring to the key, the wire, after forming the base coil, can be brought inwardly to terminate with a reduced diameter coil encircling the shank of the key. The key and spring may also be formed as a unit of a single piece of wire, as disclosed in Figure 5, in which the spring, at its forward or peak end, continues from the formation of the head or fingerhold with a convolution intimately about the shank of the key immediately adjacent the head.

Having described my invention, I claim:

A fastener for an automobile radiator protector, comprising, a key formed of wire and possessing a straight shank portion having a hook bent at one end thereof for cooperating detachably with a part to which the fastener is to be attached, a loop at the opposite end of the shank portion providing a head and a fingerhold, a washer engaged upon the shank of the key, and a helical spring about the shank of the key interposed between said head and washer, serving, when the spring is under compression, to hold the key in place, said washer embossed to seat the base end of the spring and sustain the same against lateral displacement, and apertured to interlock with the hook end of the key to hold the parts in assembled relation.

CLARENCE J. RENNEKAMP.